United States Patent [19]

Jameson

[11] Patent Number: 4,535,919
[45] Date of Patent: Aug. 20, 1985

[54] HOT MELT ADHESIVE SYSTEM

[75] Inventor: Calvin R. Jameson, Atlanta, Ga.

[73] Assignee: Nordson Corporation, Amherst, Ohio

[21] Appl. No.: 294,191

[22] Filed: Aug. 19, 1981

[51] Int. Cl.³ .............................................. F04C 15/04
[52] U.S. Cl. ................................ 222/190; 137/462.5; 137/504; 137/538; 239/124
[58] Field of Search ................ 222/146 HE, 190, 318; 137/501, 538, 467.5, 484.4, 504; 239/124

[56] References Cited

U.S. PATENT DOCUMENTS

| | | | |
|---|---|---|---|
| 2,011,333 | 8/1935 | Clifton | 137/538 |
| 2,616,445 | 11/1952 | Gaddoni | 137/538 X |
| 3,806,037 | 4/1974 | Loewenkamp | 239/124 X |
| 3,892,339 | 7/1975 | Idler | 222/318 |
| 4,059,466 | 11/1977 | Scholl et al. | |
| 4,059,714 | 11/1977 | Scholl et al. | |
| 4,200,207 | 4/1980 | Akers et al. | |
| 4,237,922 | 12/1980 | Maier | 137/501 X |

Primary Examiner—Joseph J. Rolla
Assistant Examiner—Frederick R. Handren
Attorney, Agent, or Firm—Wood, Herron & Evans

[57] ABSTRACT

A hot melt foam adhesive system including a gear pump wherein gas is mixed under pressure into the molten adhesive and is driven into solution with the adhesive. The adhesive/gas solution is supplied at a relatively high pressure to a valved dispenser or gun from where it is dispensed onto a substrate. As the adhesive/gas solution emerges from the dispenser, the gas comes out of solution but remains entrapped in the adhesive, thereby forming an adhesive foam. The system includes a recycle flow line or hose for returning adhesive/gas solution from the dispenser to the pump. Within this recycle flow line there is a pressure regulator responsive to flow changes or viscosity changes of the adhesive/gas solution for maintaining a fixed back pressure in the system, thereby enabling the system to maintain a fixed and uniform flow rate from the dispenser during all operating conditions of the dispenser.

20 Claims, 6 Drawing Figures

HOT MELT ADHESIVE SYSTEM

This invention relates to hot melt adhesive systems and more particularly, to hot melt adhesive foam systems. More specifically, this invention relates to such a system having an improved pressure control within the system for maintaining a fixed back pressure at the dispenser, thereby improving the uniformity of the dispenser flow.

Hot melt adhesives are widely used throughout industry for adhering substrates one with another in many diverse applications. One of the most common uses of such adhesives is in the packaging and cartoning industries, where the quick setting time of hot melt adhesives is particularly advantageous. In this end use, a common problem is the difficulty of compressing hot melt adhesive after application so as to obtain sufficient "squeeze out" of the adhesive between the substrates, to achieve a good bond of adequate surface area. The relatively high viscosity, high surface tension, and quick setting time of many hot melt adhesives tend to restrain liquid adhesive from spreading over as large a substrate surface area as is desirable. Instead of spreading, the deposited liquid sets up as a thick bead on the structure. Even when quickly compressed, as for example between two flaps of a carton, the adhesive is difficult to spread. When two adhered surfaces are pulled apart, it is generally found that it is the substrate which fails, rather than the adhesive to substrate interface. Consequently, the greater the area of interface or surface contact between the adhesive and the substrate, the stronger the bond will be.

It has recently been discovered that the adhesive strength of a bond achieved with a given quantity of a selected hot melt adhesive may be appreciably improved, and in most instances at least doubled, if the adhesive is applied as a cellular foam rather than in the conventional way as a non-foamed adhesive. The increased bonding strength of the foamed adhesive results at least in part from the fact that the adhesive foam may be spread over at least twice the area, under the same compressive conditions, as an equal mass of adhesive which has not been foamed. Hot melt adhesive foam also has been found to have a longer "open" time, after it has been deposited onto a first substrate and during which it can effectively bond to a second substrate when pressed against it, yet it has a shorter "tack time" i.e., it will set up and adhere faster after it has been compressed between two substrates. These characteristics together are particularly desirable in cartoning applications. There is no need to close flaps immediately after applying foamed adhesive onto one of the flaps. Also, "pop opening" is very substantially reduced, and the adhered surfaces may be released from clamping pressure soon after application of that pressure. These discoveries are disclosed in Scholl, et al U.S. Pat. No. 4,059,714, issued Nov. 22, 1977, entitled "Hot Melt Thermoplastic Adhesive Foam System", and in Scholl, et al U.S. Pat. No. 4,059,466, also issued Nov. 22, 1977, entitled "Hot Melt Thermoplastic Adhesive Foam System", both of which are assigned to the assignee of this application.

As shown in those patents, in producing a hot melt adhesive foam, if a gas such as air or nitrogen is thoroughly mixed with liquid hot melt adhesive, the gas can go into solution in the adhesive. When the adhesive/gas solution is subsequently dispensed, as from a conventional valved type of adhesive dispenser or gun, the gas will come out of solution but remains entrapped in the adhesive, to form a closed cell hot melt adhesive foam having the desirable adhesive characteristics described above.

In one preferred embodiment of such a system described in Akers, et al U.S. Pat. No. 4,200,207, and assigned to the assignee of this application, solid thermoplastic adhesive material is heated and melted in a reservoir and the molten adhesive is introduced into a two stage gear pump. Within the gear pump the gas and liquid adhesive are mixed, and the gas is forced into solution with the molten liquid adhesive. The liquid/gas adhesive solution, under pump outlet pressure, is then supplied to a valved type of adhesive dispenser from which the adhesive can selectively be dispensed at atmospheric pressure. Upon emerging from the outlet nozzle of the dispenser, the gas evolves from the solution in the form of small bubbles causing the adhesive to expand volumetrically to form a hot melt adhesive foam. The resultant adhesive foam, if left in an uncompressed state, would set up as a homogeneous foam having air or gas cells evenly distributed throughout, and it has the desired adhesive characteristics mentioned above.

It is important for most applications that the flow of adhesive/gas solution from the valve's dispenser or gun be very smooth and of a uniform flow rate. This is particularly critical in intermittent flow applications such as is commonly used on carton flaps wherein beads of adhesive are applied to the flaps by rapidly and repetitively opening and closing the valve of the dispenser. Otherwise expressed, it is important that the flow of adhesive from the dispenser onto the substrate should be uniform regardless of whether the dispenser is open for a relatively long period of time or whether it is rapidly cycled on and off. If the flow is not even, the bead is generally characterized by being thick or wide initially and then tapering to a thin slower flow rate.

Accordingly, it has been the primary objective of this invention to provide an improved hot melt adhesive system adapted to deliver an adhesive at a substantially constant flow rate with minimal variation of the output per unit time.

In accordance with this objective, a hot melt system incorporating this invention comprises a two stage pump to which gas and adhesive are supplied and from which an adhesive/gas solution is supplied to a dispenser. The system includes a recycle flow line connecting the gun back to the pump such that whenever the valve of the gun is closed or partially closed, flow continues from the pump to the gun and back from the gun to the pump. Thereby, even though the gun may be left closed for protracted periods of time, molten adhesive will not be left standing in the gun to become overheated, chilled, or degraded as a result of being maintained in a molten state at elevated temperatures for an excessive period of time.

Located within the recycle flow line there is a pressure regulator operative to maintain a fixed back pressure in the system and particularly at the gun. This pressure regulator is operative to maintain a fixed back pressure in the system even though there are changes in the flow rate through the regulator or viscosity changes in the adhesive/gas solution to the gun. Otherwise expressed, this pressure regulator is responsive to flow and viscosity changes in the adhesive/gas solution to maintain a fixed back pressure in the system, thereby enabling the gun or dispenser to dispense a uniform constant flow of adhesive under all operating conditions of the gun.

Still another objective of this invention has been to provide an improved pressure regulator for use in a hot melt dispensing system. Most hot melt materials may only be maintained in the molten state for limited periods of time without the material becoming burnt or charred and losing its adhesive quality. Therefore, it is imperative in any hot melt system that there be no dead spots or areas capable of catching and retaining the hot melt material long enough for it to char and then when it does break loose, clog the system or emerge from the system as a non-adhesive solid. The improved pressure regulator of this invention avoids all dead spots or dead end passages so that all molten material which enters the pressure regulator passes through it without becoming entrapped therein.

The primary advantage of this invention is that it enables the flow of molten adhesive or thermoplastic material from a hot melt dispenser to be maintained uniform or constant per unit time under all operating conditions of the dispenser, including intermittent flow conditions.

These and other objects and advantages of this invention will be more readily apparent from the following description of the drawings in which.

Figures 1, 1A:
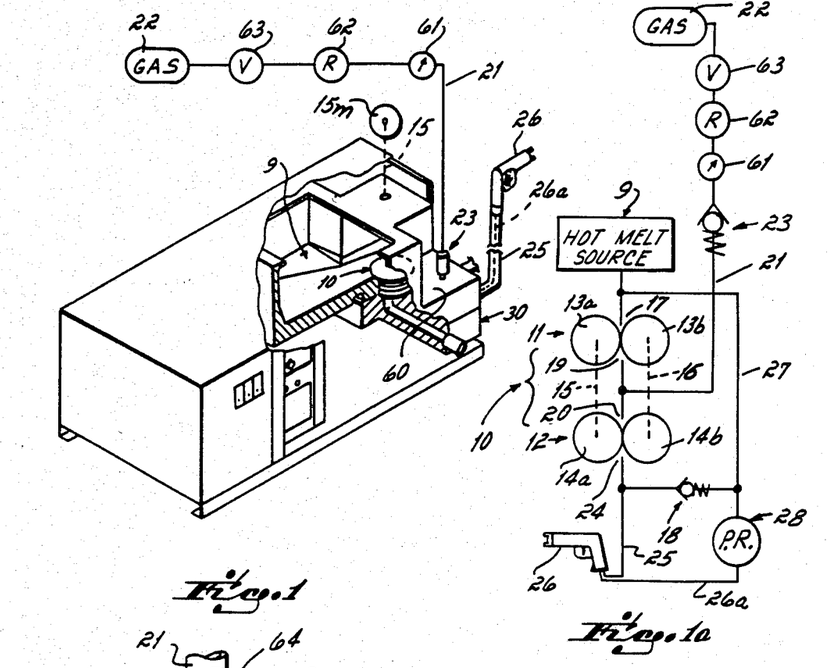
FIG. 1 is a partially diagrammatic illustration, partially broken away, of a hot melt foam adhesive system incorporating the invention of this application.
FIG. 1a is a diagrammatic illustration of the system of FIG. 1.

With reference to FIGS. 1 and 1a, the improved system of this invention includes a heated reservoir 9 within which solid thermoplastic adhesive is heated and melted, or to which thermoplastic adhesive, which is solid at room temperature, is supplied in the molten state. The molten adhesive is supplied from the reservoir to a two-stage gear pump 10 having a first stage 11 and a second stage 12, each stage comprising oppositely rotating and meshed gear pairs 13a and b, and 14a and b respectively. The driven gears 13a, 14a of each stage are connected by a common drive shaft 15 to a drive motor 15m, and the idler gears 13b, 14b of each stage are connected by common idler shaft 16. The molten hot melt adhesive is introduced, for example at atmospheric pressure into the low pressure side 17 of the first stage pump 11 from the reservoir 9. The adhesive is delivered at the outlet side 19 of the first pump 11 at a metered rate, and from there is introduced into inlet side 20 of the second stage pump. A gas, e.g., air, nitrogen or carbon dioxide, is also introduced into inlet 20 of second stage pump 12, through a gas line 21 from a gas source 22 which may for example be regulated at a pressure in the range of about 1-45 psi. Gas inlet line 21 includes a check valve 23 that prevents back flow of molten adhesive from the second stage pump's inlet side 20 through that line 21 toward the gas source 22.

The gas and molten adhesive are intimately admixed in second stage pump 12, which places them under such pressure that the gas goes into solution with the molten adhesive, thereby providing the molten adhesive/gas solution previously discussed. This solution is ejected from the outlet side 24 of second stage pump 12 through a line 25 to a valved adhesive dispenser 26, e.g., a gun or the like. One valved dispenser structure which may be used with the pump of this invention is illustrated in U.S. Pat. No. 4,059,714, previously referred to. A recycle line 27 is provided between the outlet side 24 of second stage pump 12 and the inlet side 17 of first stage pump 11. This recycle line includes a relief valve 18 therein, for recycling a part or all of the adhesive/gas solution if the system pressure exceeds the relief setting of valve 18. A pressure regulator 28 in the return hose or line 26a from dispenser 26 restricts the recycle flow during cycling of a gun and maintains a fixed back pressure in the system.

In effect, first stage pump 11 meters and delivers molten hot melt adhesive to the inlet side 20 of second stage pump 12. It stabilizes the second stage against viscosity changes and motor speed changes. The second stage pump 12 functions as a mixing device for intimately admixing and pressurizing into solution the metered molten hot melt adhesive from first stage pump 11 with the gas infeed from source 22. It has been found that the combination of a first stage metering pump 11 with the second stage mixing pump 12 provides a more uniform adhesive/gas solution output, and that this in turn enhances the reliability and continuity of the adhesive foam output from the valved dispenser 26. In other words, this pump 10 structure improves the mixing of the adhesive and gas and insures that the foam dispensed will be relatively uniform and virtually free from spitting and sputtering.

Figure 2:
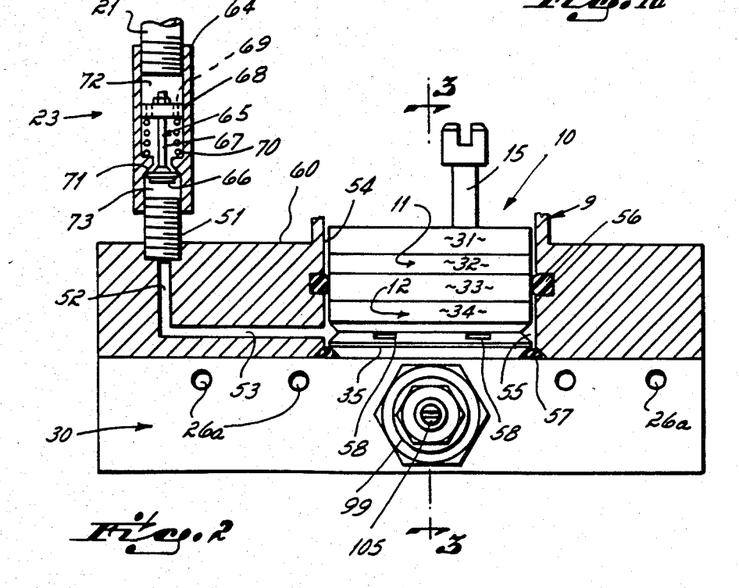
FIG. 2 is a side elevational view, partially broken away, of the pump section of the system of FIG. 1.
Figure 3:
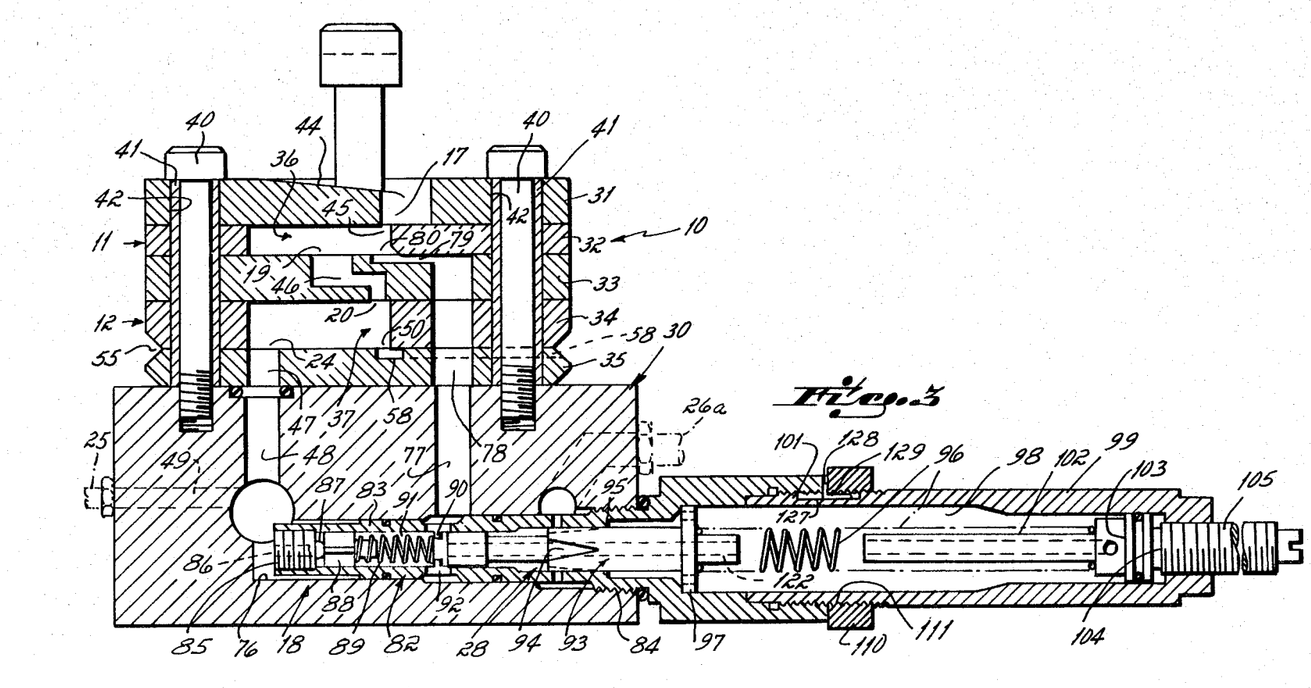
FIG. 3 is a cross sectional view taken on line 3—3 of FIG. 2.

More particularly, and with specific reference to FIGS. 2 and 3, the adhesive foam pump 10 includes a series of specially configured plates stacked on top of, and connected to, a manifold block 30. As shown, the pump 10 includes an inlet end plate 31, a first stage pump plate 32, a center port plate 33, a second stage pump plate 34, and an outlet end plate 35, all of generally the same peripheral configuration and size, and all stacked one on top of the other.

First stage pump plate 32 defines a cavity 36, which receives the first pair of meshed gears 13a, 13b. The second stage or mixing pump plate 34 also defines a cavity 37 which receives the second pair of meshed gears 14a, 14b. The second stage pump 12 has a displacement greater than that of the first stage because the gears of the second stage have a greater thickness than the gears of the first stage. The volume of gas delivered to the second stage from source 22 fills the additional displacement volume of the second stage, i.e., the volume which is in excess of the volume of hot melt received therein.

The pump's plates 31-35 are retained in aligned stacked assembled relationship by four bolts (not shown) received therethrough and into threaded bores in the inlet end plate 31, the heads of those bolts being received in seats provided in the end plate 35. Through-bolts 40 pass through positioner sleeve 41 in plate bores 42, and are threaded into tapped bores in the manifold block 30 to mount the preassembled plates 31-35 to the manifold block.

As shown in FIG. 3, the inlet port plate 31 provides a first stage hot melt inlet port 17 therethrough, that inlet port cooperating with an angled infeed throat 44 defined in the top surface of that port plate. Inlet port 17 opens into first stage hot melt inlet zone 45, where the gears come out of mesh. The first stage pump plate 32 also includes a first stage outlet zone 19 from which the metered molten hot melt adhesive is directed into intermediate transfer port structure 46 defined in the center port plate 33. The intermediate transfer port structure directs metered molten adhesive from outlet side 19 of first stage pump 11 to inlet side 20 of second stage pump 12. This intermediate transfer port structure includes first stage hot melt outlet port 19, first to second stage transfer bore 46, and second stage hot melt in port 20, all defined in center port plate 33. The metered molten adhesive from first stage pump 11 is thereby introduced into second stage pump 12 from the top side thereof. The second stage pump plate 34 further defines the second stage hot melt "in" zone 20 and the second stage "out" zone 24. The molten adhesive/gas solution exits via outlet 24 of the second stage pump 12. The outlet port 24 cooperates with an outlet throughbore 47 in outlet end plate 35, and that outlet throughbore 47 connects the second stage outlet port 24 with discharge bore 48 in the manifold block 30. The discharge bore section 48 in the manifold block is connected via bore 49 and line 25 with the valved adhesive dispenser 26. The gas is introduced into inlet side 20 of second stage pump 12 from the bottom side thereof through gas inlet zone 50. With reference to FIG. 2 is will be seen that the check valve 23 is attached to the top side of the reservoir 9 via a conventional threaded fitting 51. This fitting is threaded into a threaded section of a counterbored vertical passage 52 which connects with a passage 53 leading to a bore 54 of the reservoir 9 within which the pump 10 is mounted. The exterior of the pump 10 is provided with a peripheral groove 55 located at the interface between the plates 34, 35 of the pump. This groove 55 communicates with the passage 53 such that gas flowing through the check valve 23 and passages 52, 53 enters the annular groove 55 around the exterior of the pump. This groove is sealed by a pair of O-rings 56, 57 located above and beneath the annular groove 55. Both of these O-rings contact the exterior surface of the pump and the surface of the bore within which the pump is mounted so as to seal the annular groove 55 against the escape of gas from the channel 55. A pair of channels or grooves 58 in the top surface of the plate 35 converge toward the pump's axis and interconnect the annular groove 55 with the gas inlet zone 50 of the pump through which gas is introduced into the second stage 12 of the pump. Consequently, gas supplied to the check valve 23 flows via the check valve 23, the passages 52, 53, the annular groove 55, and the channels 58 to the inlet zone 50.

The check valve 23 is mounted above the level of the bottom surface 60 of the reservoir 9 and above the level of the pump 10. This check valve 23 is operative to prevent the back flow of hot melt adhesive from the pump to the gas flow controls including the gas flow control gauge 61, pressure regulator 62, and a solenoid control valve 63, all of which are in the gas flow control line 21 between the gas source 22 and the check valve 23.

The check valve 23 is a poppet style of valve comprising a cylinder 64 and a poppet 65. The poppet has a poppet head 66 connected by a stem 67 to a stop 68 bolted onto the end of the stem 67. The stop 68 is ported as illustrated at 69 so as to permit the flow of gas past the stop. Internally of the cylinder 64 of the valve there is a compression spring 70 operative to pull the poppet head 66 of the valve into sealing contact with a valve seat 71. Preferably there is an O-ring mounted in the poppet head 66 and sealingly engageable with the seat 71 to maintain a gas tight seal between the upstream side 72 of the valve and the downstream side 73. When the solenoid valve 63 in the line 21 is opened, gas under pressure is operative to act upon the poppet 65 of the valve and force the valve open so as to permit the flow of gas through the relief valve to the inlet zone 50 of the pump.

As seen in FIG. 3, the primary flow path, through the pump, of molten hot melt adhesive and of molten adhesive/gas solution once that solution is admixed in the second stage pump 12 is through bores 48, 49 in the manifold block 30 and hose 25 which in use is connected to a gun. However, a recycle flow path is also provided by which a portion of all of the molten adhesive/gas solution can be recycled back through the pump 10 from the gun, into the first stage pump's inlet zone 45, as illustrated by dotted arrow 75 in FIG. 4. (This dotted path 75 corresponds to the recycle path 27 in FIG. 1a). For this purpose, recycle passages are provided in center port plate 33, second stage pump plate 34, outlet end plate 35 and manifold block 30. As shown in FIG. 3, these recycle passages include the bore 48, a bore 76 (having relief valve 18 described below therein), a vertical bore 77, a bore 78 through the plates 35, 34, 33 and a lateral passage 79 defined between first stage pump plate 32 and center port plate 33. The recycle passages connect with inlet zone 45 of first stage pump 11, from the bottom surface of first stage pump plate 32 at a recycle inlet port 80, for introducing recycle flow of molten adhesive/gas solution from outlet 24 of second stage pump 12 into hot melt inlet zone 45 while molten adhesive (without gas) from inlet 17 is added to the recirculated material in zone 45.

The relief valve indicated at 18 in FIGS. 1a and 3 may be incorporated as part of pressure regulator valve structure designated generally as 82 in FIG. 3 which is received in bore 76 of manifold 30. This pressure regulator valve structure 82 includes an outer sleeve 83 which is threaded into bore 76 at 84. A relief valve seat 85 is secured at the inner end of sleeve 83. Seat 85 has an axial port 86 on which is seated a ball 87. Ball 87 is biased against port 86 by a cruciform shaped guide 88 acted upon by a spring 89. This spring 89 is a compression spring located between the guide 88 and an internal shoulder 90 of the sleeve 83. Ball 87 is thereby biased toward its seat and bore 86 to form the relief valve 18.

Sleeve 83 is sealed with respect to bore 76 by O-rings. An internal chamber 91 inside sleeve 83 opens through the sleeve wall via radial ports 92 into communication with recycle bore 77 of the manifold. In the event of excessive pressure build-up within the hoses of the dispenser, a high pressure condition will exist in bore 48. This condition will be relieved by the opening of the relief valve 18 so that fluid can flow through bore 86, the interior 91 of sleeve 83, and radial ports 92 to recycle bore 77.

As indicated diagrammatically in FIG. 1a return line 26a from valved dispenser 26 includes a pressure regulator 28. Preferably, as shown in FIG. 3, this pressure regulator 28 is also included as part of the circulation valve structure 82. More specifically, an adjustable valve member 93 is axially positionable in the interior of sleeve 83 to the right of ports 92. Valve member 93 presents three notches or grooves 94 equally spaced 120° apart at its inner end, each of these grooves 94 having a V-shape as seen in section which forms a valve with a shoulder 95 in sleeve 83. Notches 94 are biased to a closed position relative to shoulder 95 by a compression spring 96 engaging one end 97 of the valve member 93.

This spring 96 is housed within a closed chamber 98 of a pressure adjustment sleeve 99. This sleeve 99 is threaded into a counterbored end section 101 of the valve sleeve 83. The spring 96 at its end remote from the valve 93 fits over a tubular end section 102 of a piston 103 and is engageable with the end of the piston to bias it against the end 104 of an adjustment screw 105 threaded into the end of the sleeve 99. By rotating the screw 105 the position of the piston 103 may be varied to adjust the compression of the spring 96 and thereby the pressure required to effect displacement of the adjustable valve member 93.

There is an axial keyway 127 in the threaded section 111 of the sleeve 99 and multiple radial slots 128 in the end section 101 of the valve sleeve 83. An "L" shaped metal key 129 is contained in the keyway and one of the slots with lock nut 110 threaded over threaded end section 111 of sleeve 99. This lock nut rigidly locks the key 127 with the sleeve 99 and with the valve sleeve 83 so as to prevent those two sleeves from becoming inadvertently disengaged.

The purpose of the pressure regulator 28 is to maintain a fixed back pressure $P_1$ in the recycle hose 26a and consequently in the dispenser gun 26 as well as throughout the system. So long as this back pressure $P_1$ remains constant, the flow of adhesive/gas solution from the valve dispenser 26 will remain constant.

As explained more fully hereinafter, this regulator 28 is operative to maintain the pressure in line 26a constant during flow changes through the regulator 28 as well as during viscosity changes in the adhesive/gas solution flowing through the regulator. Prior to this invention and as described in the above identified U.S. Pat. No. 4,200,207 there was only a flow restrictor in the line 26a for maintaining back pressure in recycle line 26a and as a result, flow or viscosity changes in the solution returning to the pump via line 26a resulted in undesirable pressure changes in that line and throughout the system.

Figure 4:
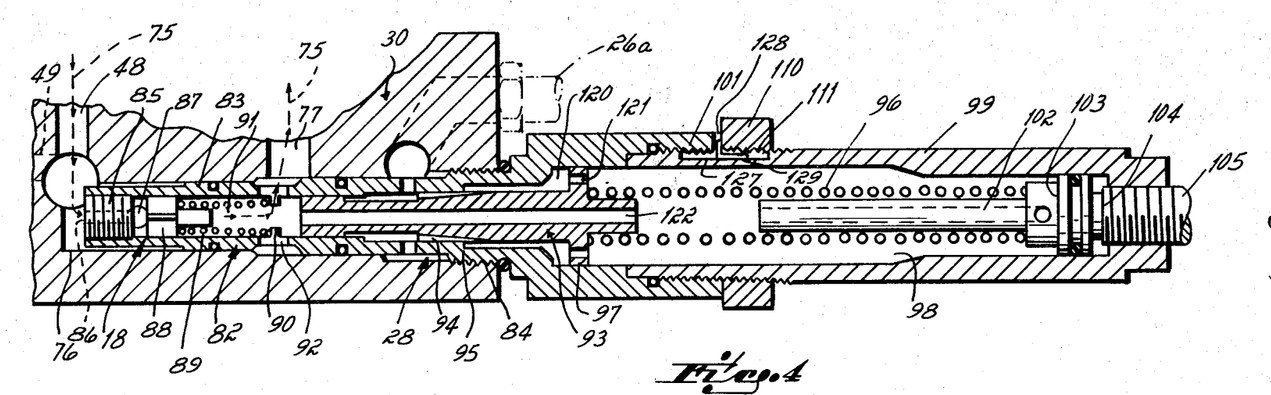
FIG. 4 is a cross sectional view of the pressure regulator section of FIG. 3, but illustrating the pressure regulator in a condition in which there is adhesive/gas solution flow through the regulator.

With reference now to FIG. 3 it will be seen that upon start-up of flow of liquid adhesive/gas solution through the line 26a, the valve 93 will be moved rightward from the position illustrated in FIG. 3 to the position illustrated in FIG. 4. This rightward movement is required so as to enable liquid to flow via the variable restrictor of valve 28 (notch 94 and shoulder 95) into the chamber 120. From the chamber 120 the adhesive/gas solution flows via orifices 121 into the chamber 98 and from the chamber 98 via bore 122 in the valve member 93 to the ports 92 into the vertical bores 77, 78 to the pump.

Figure 5:
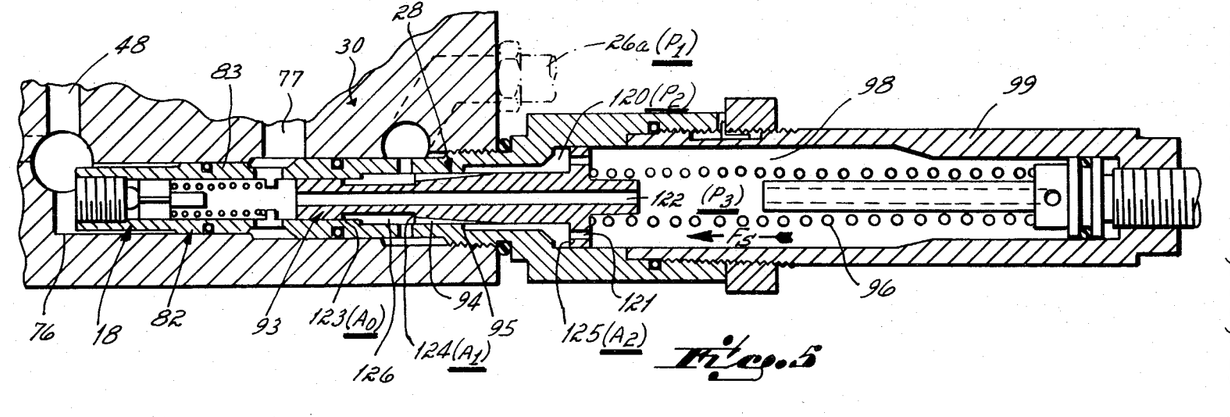
FIG. 5 is a view of the pressure regulator valve similar to FIG. 4 but having additional pressure and area indicia applied thereto.

For purposes of explaining how the pressure relief valve 28 is operative to maintain a fixed back pressure in line 26a, attention is directed to FIG. 5. With reference to FIG. 5 it will be seen that the pressure in line 26a is designated as $P_1$, the pressure in chamber 120 is designed as $P_2$, and the pressure in chamber 98 is designated as $P_3$. The area of the shoulder 123 of valve member 93 is designated $A_0$. The area of the shoulder 124 of valve member 93 is designated as $A_1$ and the area of the shoulder 125 of valve member 93 is designated as $A_2$. It will be appreciated that in flowing from the chamber 126 into the chamber 120 the adhesive/gas solution at pressure $P_1$ experiences a pressure drop, as a consequence of its flowing through the restricted orifices provided by the grooves 94 and shoulder 95. This pressure drop is equal to $(P_1-P_2)$. Similarly, in flowing through the restricted ports 121 in the valve member 93 the adhesive/gas solution experiences a pressure drop equal to $(P_2-P_3)$.

At start-up the valve spool 93 moves from the position illustrated in FIG. 3 to the position illustrated in FIG. 4 until such time as the force $F_s$ of the spring 96 balances the pressure drop occurring at the variable restrictor slot 94 and the fixed restrictor orifices 121 multiplied by the areas over which those pressure drops are operative. At this point when the pressure $P_1$ equals the pressure setting of the pressure regulator 28, there is a force balance between the pressure and the spring as follows: $F_s=P_1(A_1-A_0)+P_2A_2$.

With reference to FIG. 5, if the flow rate then drops, the pressure drop $(P_2-P_3)$ will decrease because of reduced flow through the fixed orifices 121 thus decreasing $P_2$ (the pressure in chamber 120) and unbalancing the force equilibrium equation set forth hereinabove. As a consequence of this unbalance the spring force $F_s$ of spring 96 exceeds the balancing pressure forces and the spool moves to the left. This spool motion further closes or restricts the variable orifice of slots 94 between chambers 126 and 120, thereby increasing the pressure drop $(P_1-P_2)$ effected by the variable orifice 94. As the variable restrictor 94 moves to the left, $P_1$ increases so as to maintain the force balance equation. Otherwise expressed, the valve spool 93 moves to the left a distance to maintain the pressure $P_1$ at a fixed value to compensate for the reduced flow through the pressure regulator valve.

In the same way that flow changes are compensated for by the pressure regulator, viscosity changes are similarly compensated for so as to maintain the pressure $P_1$ at a fixed value. Viscosity changes occur as a consequence of a varying of the quantity of gas driven into the adhesive/gas solution. As the solution is continuously recycled, as for example occurs when the valve of the dispenser 26 is left closed for a protracted period of time, the level of gas in solution increases and viscosity decreases. The pressure regulator 28 compensates for these viscosity changes in the same way that it compensates for flow changes. That is, a lower viscosity has the same effect of lowering the pressure $P_2$ in chamber 120 and thereby allows the valve to slide to the left, closing the variable restrictor 94 and maintaining $P_1$ in line 26a at a relatively fixed value.

The pump 10 and the hot melt adhesive foam system within which it is employed, is the subject of the above identified U.S. Pat. No. 4,200,207. That patent is hereby incorporated by reference for a more complete description of the pump 10 and the adhesive foam system. The invention of the application resides in the provision in the system of a pressure regulator 28 and in the configuration of the pressure regulator which enables it to compensate for changes in the flow and viscosity of the adhesive/gas solution in the recycle line 26a to maintain a fixed back pressure in the system.

In use, when pump 10 is operating, molten hot melt adhesive is introduced through port 17 in inlet port plate 31 into first stage pump 11. The hot melt adhesive entering the first stage pump may be at ambient pressure. The molten adhesive infeed is metered by the first stage pump and transferred from outlet 19 through port 46 to inlet 20 of second stage pump 12. The gas from the source 22 is supplied via valve 63, pressure regulator 62 and pressure gauge 61 and valve 23 to the gas inlet zone 50 from which it is introduced into second stage pump 12 just after introduction of the metered molten adhesive from first stage pump 11. The pressure at which the gas is introduced will control the density of the foam; pressures in the range of approximately 1–45 psig have already been used. The second stage pump 12 mixes the adhesive and gas to provide, under pressure, a molten adhesive/gas solution which is exhausted from the outlet side 24 of the second stage pump, into the discharge bore 48 of manifold block 30. When valved dispenser 26 is discharging adhesive, relief valve 18 restricts recycle flow of the solution, except for so much as is permitted to flow via pressure regulator 28 to maintain the back pressure in the gun 26 at a preset pressure. When the valved dispenser is closed, no adhesive foam is being dispensed, the pressurized adhesive/gas solution continues to recycle through the pressure regulator 28 with any excess flow being recycled through valve 18, sleeve interior 91, recycle bore 77 in the manifold block 30, through recycle bore 78 of outlet end plate 35, second stage pump plate 34, and center port plate 33, back to inlet zone 45 of the first stage pump 11.

The primary advantage of this hot melt adhesive foam system relative to the system disclosed in U.S. Pat. No. 4,200,207, is that it maintains a more even flow of adhesive from the dispenser 26 under all operating conditions of the dispenser than does the system disclosed in U.S. Pat. No. 4,200,207. Specifically, it maintains a relatively constant flow rate from the dispenser even though the flow from the gun may be varied for constant long duration flow to short duration intermittent flow or even though the density and viscosity of the solution may be varied.

Throughout this specification and claims, the term "solution" has been used to describe the molten liquid adhesive/gas dispersion supplied under high pressure which, when dispensed from a dispenser at atmospheric pressure, will provide a foamed adhesive. It is believed this mixture is a true solution in which the gas is molecularly dispersed in the liquid adhesive. However, as used in the specification and the claims hereof, the term is intended to encompass the broader concept of a gas homogeneously mixed with a molten liquid adhesive or sealant material whether or not the gas is in fact molecularly dispersed. Further, throughout this specification and claims the phrase "hot melt adhesive" has been used as meaning a solvent-free material which is applied in a molten state.

While the improved pressure regulator of this invention has been described in relation to a hot melt foam adhesive dispensing system wherein pressure must be controlled under widely varying flow and viscosity changing conditions, it will be appreciated by those skilled in this art that the invention is also applicable to all hot melt dispensing systems whether or not the material is foamed. Furthermore, the invention has been described in relation to hot melt adhesive material, but it is equally applicable to other hot melt thermoplastic materials which are dispensed in a molten state, as for example hot melt sealant materials.

Having described in detail the preferred embodiment of the invention, what is desired to be claimed and protected by Letters Patent is:

1. Apparatus for dispensing a foamed adhesive or sealant material, said apparatus comprising,
   a pump,
   means for supplying said material in a liquid state to said pump,
   a source of gas,
   means for supplying gas from said source to said pump such that said pump is operable to agitate said liquid material in the presence of the gas so as to distribute said gas throughout said liquid material and to pressurize said liquid material and gas to place said gas into solution with the liquid material,
   means for dispensing said liquid material and gas solution at a pressure below the solution maintenance pressure of said liquid material and gas solution whereby the gas is released from solution as said liquid forms a foam,
   first fluid conduit means for supplying said liquid material and gas solution from said pump to said dispensing means,
   second fluid conduit means for recycling said liquid material and gas solution from said dispensing means back to said pump,
   third fluid conduit means including a spring biased pressure relief valve means for interconnecting said first and second fluid conduit means, and
   a spring biased pressure regulator contained within said second fluid conduit means for maintaining a substantially constant back pressure of liquid material and gas solution within said dispensing means, and
   said pressure regulator including a variable orifice and means including a fixed orifice restrictor responsive to changes in flow and changes in the viscosity of liquid material and gas solution flowing through said pressure regulator to vary the size of said variable orifice.

2. Apparatus for dispensing a foamed adhesive or sealant material, said apparatus comprising,
   a pump,
   means for supplying said material in a liquid state to said pump,
   a source of gas,
   means for supplying gas from said source to said pump such that said pump is operable to agitate said liquid material in the presence of the gas so as to distribute said gas throughout said liquid material and to pressurize said liquid material and gas to place said gas into solution with the liquid material,
   means for dispensing said liquid material and gas solution at a pressure below the solution maintenance pressure of said liquid material and gas solution whereby the gas is released from solution as said liquid forms a foam,
   first fluid conduit means for supplying said liquid material and gas solution from said pump to said dispensing means,
   second fluid conduit means for recycling said liquid material and gas solution from said dispensing means back to said pump, and
   third fluid conduit means including a spring biased pressure relief valve means for interconnecting said first and second fluid conduit means,
   a spring biased pressure regulator contained within said second fluid conduit means for maintaining a substantially constant back pressure of liquid material and gas solution within said dispensing means, said pressure regulator including a valve spool having a variable restricted orifice therein, and means including a fixed orifice restrictor for varying the size of said variable restricted orifice in response to changes in the flow rate of liquid adhesive and gas solution through said pressure regulator.

3. Apparatus for dispensing a foamed adhesive or sealant material, said apparatus comprising, a pump, means for supplying said material in a liquid state to said pump, a source of gas, means for supplying gas from said source to said pump such that said pump is operable to agitate said liquid material in the presence of the gas so as to distribute said gas throughout said liquid material and to pressurize said liquid material and gas to place said gas into solution with the liquid material, means for dispensing said liquid material and gas solution at a pressure below the solution maintenance pressure of said liquid material and gas solution whereby the gas is released from solution as said liquid forms a foam, first fluid conduit means for supplying said liquid material and gas solution from said pump to said dispensing means, second fluid conduit means for recycling said liquid material and gas solution from said dispensing means back to said pump, and third fluid conduit means including a spring biased pressure relief valve means for interconnecting said first and second fluid conduit means, a spring biased pressure regulator contained within said second fluid conduit means for maintaining a substantially constant back pressure of liquid material and gas solution within said dispensing means, said pressure regulator including a valve spool having a variable restricted orifice therein, and means including a fixed orifice restrictor for varying the size of said variable restricted orifice in response to changes of viscosity of the liquid adhesive and gas solution flowing through said pressure regulator.

4. Apparatus for dispensing a foamed adhesive or sealant material, said apparatus comprising, a pump, means for supplying said material in a liquid state to said pump, a source of gas, means for supplying gas from said source to said pump such that said pump is operable to agitate said liquid material in the presence of the gas so as to distribute said gas throughout said liquid material and to pressurize said liquid material and gas to place said gas into solution with the liquid material, means for dispensing said liquid material and gas solution at a pressure below the solution maintenance pressure of said liquid material and gas solution whereby the gas is released from solution as said liquid forms a foam, means for supplying said liquid material and gas solution from said pump to said dispensing means, means for recycling said liquid material and gas solution from said dispensing means back to said pump, and a pressure regulator contained within said recycling means for maintaining a substantially constant back pressure of liquid material and gas solution within said dispensing means, said pressure regulator including a valve sleeve having at least one shoulder formed therein, a valve spool axially movable within said valve sleeve, a variable width slot formed in said valve spool and cooperable with said shoulder to form a variable flow restrictor in said valve spool, and means including a fixed orifice restrictor for varying the size of said variable flow restrictor in response to changes of flow through said regulator.

5. The apparatus of claim 4 in which said valve spool includes a flange extending radially from said valve spool, said fixed orifice restrictor being in the form of holes extending through said flange of said valve spool.

6. The apparatus of claim 5 which further includes a pressure relief valve mounted in said valve sleeve, said pressure relief valve being operative to interconnect said liquid material and gas solution supply means to said recycling means whenever the pressure of said solution supplied to said dispensing means exceeds the setting of said pressure relief valve.

7. The apparatus of claim 6 in which said pressure relief valve is located within said valve sleeve at one end of said sleeve, said valve spool being located within said valve sleeve at the opposite end of said sleeve from said relief valve, first adjustable spring means within said sleeve for biasing said valve spool to a closed position with a variable spring force and second spring means within said sleeve for biasing said pressure relief valve to a closed position.

8. A foamed adhesive or sealant material dispensing system comprising a two stage gear pump having first and second gear stages, each of said gear stages having an inlet and an outlet, a passage for supplying liquid material to the inlet of said first stage, means for delivering said liquid from the outlet of said first stage to the inlet of said second stage, a source of gas, means for supplying gas from said source of gas to said second stage for mixing therein with said liquid, dispenser means for dispensing said mixture of liquid and gas, means for delivering said mixture of liquid and gas from said second stage to said dispenser, means for recycling said mixture of liquid and gas from said dispenser back to said first stage of said pump, a spring biased pressure regulator contained with said recycling means for maintaining a substantially constant back pressure of said mixture of liquid and gas within said dispensing means, said pressure regulator including a valve sleeve having at least one shoulder formed therein, a valve spool axially movable within said valve sleeve, a variable width slot formed in said valve spool and cooperable with said shoulder to form a variable flow restrictor in said pressure regulator, a fixed orifice restrictor formed in said valve spool, and means including said fixed orifice restrictor for varying the size of said variable flow restrictor in response to changes of flow through said regulator.

9. The apparatus of claim 8 in which said valve spool includes a flange extending radially from said valve spool, said fixed orifice restrictor being in the form of holes extending through said flange of said valve spool.

10. The apparatus of claim 9 which further includes a pressure relief valve mounted in said valve sleeve, said pressure relief valve being operative to interconnect said mixture delivering means to said recycling means whenever the pressure of said mixture supplied to said dispensing means exceeds the setting of said pressure relief valve.

11. The apparatus of claim 10 in which said pressure relief valve is located within said valve sleeve at one end of said sleeve, said valve spool being located within said valve sleeve at the opposite end of said sleeve from said relief valve, first adjustable spring means within said sleeve for biasing said valve spool to a closed position with a variable spring force and second spring means within said sleeve for biasing said pressure relief valve to a closed position.

12. Apparatus for dispensing a hot melt material which is solid at room temperature, said apparatus comprising, means for melting the material to convert it into the molten state, a pump, means for supplying said material in a molten state to said pump, means for dispensing said molten material, first fluid flow path means for supplying said molten material from said pump to said dispensing means, second fluid flow path means for recycling said molten material from said dispensing means back to said pump, third fluid flow path means including a pressure relief valve operative to interconnect said first fluid flow path means to said second fluid flow path means whenever the pressure of said molten material supplied to said dispensing means exceeds the setting of said pressure relief valve, and a spring biased pressure regulator contained within said recycling means for maintaining a substantially constant back pressure of said molten material within said dispensing means, said pressure regulator including a valve sleeve having at least one shoulder formed therein, a valve spool axially movable within said valve sleeve, a variable width slot formed in said valve spool and cooperable with said shoulder to form a variable flow restrictor in said pressure regulator, a fixed orifice restrictor formed in said valve spool, and means for varying the size of said variable flow restrictor in response to changes of flow through said regulator.

13. The apparatus of claim 12 in which said valve spool includes a flange extending radially from said valve spool, said fixed orifice restrictor being in the form of at least one hole extending through said flange of said valve spool.

14. The apparatus of claim 13 in which said pressure relief valve is mounted in said valve sleeve.

15. The apparatus of claim 14 in which said pressure relief valve is located within said valve sleeve at one end of said sleeve, said valve spool being located within said valve sleeve at the opposite end of said sleeve from said relief valve, first adjustable spring means within said sleeve for biasing said valve spool to a closed position with a variable spring force and second spring means within said sleeve for biasing said pressure relief valve to a closed position.

16. Apparatus for dispensing a hot melt material which is solid at room temperature, said apparatus comprising, means for melting the material to convert it into the molten state, a pump, means for supplying said material in a molten state to said pump, means for dispensing said molten material, first fluid flow path means for supplying said molten material from said pump to said dispensing means, second fluid flow path means for recycling said molten material from said dispensing means back to said pump, third fluid flow path means including a pressure relief valve operative to interconnect said first fluid flow path means to said second fluid flow path means whenever the pressure of said molten material supplied to said dispensing means exceeds the setting of said pressure relief valve, and a spring biased pressure regulator contained within said recycling means for maintaining a substantially constant back pressure of said molten material within said dispensing means, said pressure regulator comprising: a valve body, said valve body having a molten material inlet and a molten material outlet, a valve spool slideably mounted within said valve body, at least one shoulder formed in said valve body, a variable size restrictor formed by said valve spool moving relative to said valve body, said variable size restrictor comprising a variable width slot formed in said valve spool and cooperable with said shoulder to form said variable size restrictor in said pressure regulator, spring means for biasing said valve spool toward a position in which said variable size restrictor is closed, and said pressure regulator being responsive to changes of rate of flow of molten material through said pressure regulator to vary the size of said variable size restrictor so as to maintain a fixed back pressure at said molten material inlet.

17. The apparatus of claim 16 which further includes adjustment means for varying the force with which said spring means biases said spool toward a position in which said variable size restrictor is closed.

18. A pressure regulator for use in a system for dispensing molten hot melt material, which pressure regulator comprises
a valve body
said body having a molten material inlet and a molten material outlet,
a valve spool slideably mounted within said valve body,
a variable size restrictor formed by said valve spool moving relative to said valve body,
a fixed size restrictor formed in said valve spool,
both of said restrictors being disposed in the path of all of the molten material flowing from said molten material inlet to said molten material outlet,
spring means for biasing said valve spool toward a position in which said variable size restrictor is closed,
said pressure regulator being responsive to changes of rate of flow of molten material through said pressure regulator to vary the size of said variable size restrictor so as to maintain a fixed back pressure at said molten material inlet, and
said valve body having at least one shoulder formed therein, said variable size restrictor comprising a variable width slot formed in said valve spool and cooperable with said shoulder to form said variable size restrictor in said pressure regulator.

19. The pressure regulator of claim 18 in which said valve spool includes a flange extending radially from said valve spool, said fixed restrictor being in the form of at least one orifice extending through said flange of said valve spool.

20. A combination pressure regulator and pressure relief valve for use in a system for dispensing molten hot melt material, which combination comprises,
a valve body,
said body having a molten material inlet and a molten material outlet, a valve spool slideably mounted within said valve body, a variable size restrictor formed by said valve spool moving relative to said valve body, a fixed restrictor formed in said valve spool, both of said restrictors being disposed in the path of all the molten material flowing from said molten material inlet to said molten material outlet, spring means for biasing said valve spool toward a position in which said variable size restrictor is closed, said pressure regulator being responsive to changes of rate of flow of molten material through said pressure regulator to vary the size of said variable size restrictor so as to maintain a fixed back pressure at said molten material inlet, a pressure relief valve mounted in said valve body, said pressure relief valve being located within a bore of said valve body at one end of said body, said valve spool being located within the same bore of said valve body at the opposite end of said body from said relief valve, first adjustable spring means within said body for biasing said valve spool to a closed position with a variable spring force, and second spring means within said body for biasing said pressure relief valve to a closed position.

* * * * *